UNITED STATES PATENT OFFICE.

JULIUS ABEL, OF MANNHEIM, AND FRITZ KALKOW, OF LUDWIGSHAFEN, GERMANY, ASSIGNORS TO THE BADISCHE ANILIN AND SODA FABRIK, OF LUDWIGSHAFEN, GERMANY.

BROWN COTTON DYE AND PROCESS OF MAKING SAME.

SPECIFICATION forming part of Letters Patent No. 658,055, dated September 18, 1900.

Application filed July 18, 1900. Serial No. 24,086. (No specimens.)

*To all whom it may concern:*

Be it known that we, JULIUS ABEL, doctor of philosophy, a citizen of the free Hansa town of Hamburg, residing at Mannheim, Grand Duchy of Baden, and FRITZ KALKOW, doctor of philosophy, a subject of the King of Prussia, Emperor of Germany, residing at Ludwigshafen-on-the-Rhine, Kingdom of Bavaria, German Empire, have invented new and useful Improvements in Brown Cotton Dyes and Processes of Making Same, of which the following is a specification.

This invention relates to a new substantive brown cotton dyestuff and method of producing the same. In the production of this new dyestuff use is made of a new derivative of diphenylamin and which is heated with sulfur and an alkaline sulfid, such as sodium sulfid, when the new dyestuff results. This new diphenylamin derivative may be prepared by treating para-amido-phenol or para-amido-phenol-ortho-sulfoacid in either aqueous or alcoholic solution in the presence of sodium carbonate or acetate or other substance capable of binding hydrochloric acid with that dichlor-dinitro-benzene to which there is ascribed (Beilstein, *Handbuch der Organischen Chemie*, third edition, Vol. 2, page 85) the following constitutional formula:

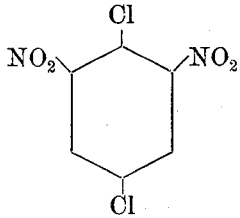

This dichlor-dinitro-benzene can be prepared by nitrating para-dichlor-nitro-benzene and can be purified by means of ethyl alcohol.

We will illustrate this invention by the following examples; but it is not limited to these. The parts are by weight.

*Example 1. Production of the diphenylamin derivative.*—Introduce twelve (12) parts of the hereinbefore-described dichlor-dinitro-benzene into a solution consisting of seven and one-half (7.5) parts of the hydrochlorid of para-amido-phenol and thirteen and six-tenths (13.6) parts of sodium acetate in eighty (80) parts of alcohol. Heat on the water-bath under a backflow-condenser for about two (2) hours. Allow to cool. Filter, press, and wash the crystalline paste with a little alcohol and water. This new diphenylamin derivative is readily soluble in caustic alkalies, such as caustic soda, and can be precipitated from such solution by means of an acid, such as hydrochloric acid. It crystallizes from ethyl alcohol or benzene in the form of needles, melting at one hundred and seventy-five (175) degrees centigrade.

If para-amido-phenol-ortho-sulfoacid in the form of its sodium salt be employed in place of the para-amido-phenol of the preceding example, preferably in aqueous solution, then a sulfonated product soluble in water results.

*Example 2. Production of the new coloring-matter.*—A mixture of ten (10) parts of the product of Example 1, twenty (20) parts of sulfur, and fifty (50) parts of crystallized sodium sulfid is slowly heated in an iron pot, while stirring, up to about one hundred and forty (140) to one hundred and fifty (150) degrees centigrade until the mass becomes dry. The dry and powdered melt can be directly used for dyeing. The coloring-matter is soluble in water containing sodium sulfid, giving a brown-red solution, and is precipitated from such solutions by hydrochloric acid or by ammonium chlorid. This new coloring-matter dyes cotton brown shades substantively from a dye-bath containing sodium sulfid, sodium carbonate, and common salt. The so-dyed material is very fast to steaming, soap, acids, chlorin, and sulfur dioxid. Treated with copper sulfate in the presence of acetic acid the color is deepened without materially altering the shade, but increasing the fastness of the color.

The dyestuff obtained when using the diphenylamin derivative obtained from para-amido-phenol or from para-amido-phenol-ortho-sulfoacid, sulfur, and sodium sulfid resemble one another very closely in all their tinctorial properties.

What is claimed is—

The new dyestuff which can be made from a hereinbefore-specified diphenylamin derivative by heating with sulfur and sodium sulfid and which dyes unmordanted cotton brown shades which are very resisting to the action of steaming, soap, acids, sulfur dioxid and of chlorin and which are deepened and are rendered more resisting by treatment with copper sulfate and acetic acid.

In testimony whereof we have hereunto set our hands in the presence of two subscribing witnesses.

JULIUS ABEL.
FRITZ KALKOW.

Witnesses:
BERNHARD C. HESSE,
PERCY J. JONES.